Jan. 26, 1937. M. CRITANI 2,068,846
DUPLEX SPRING VEHICLE BUMPER
Filed Nov. 22, 1934
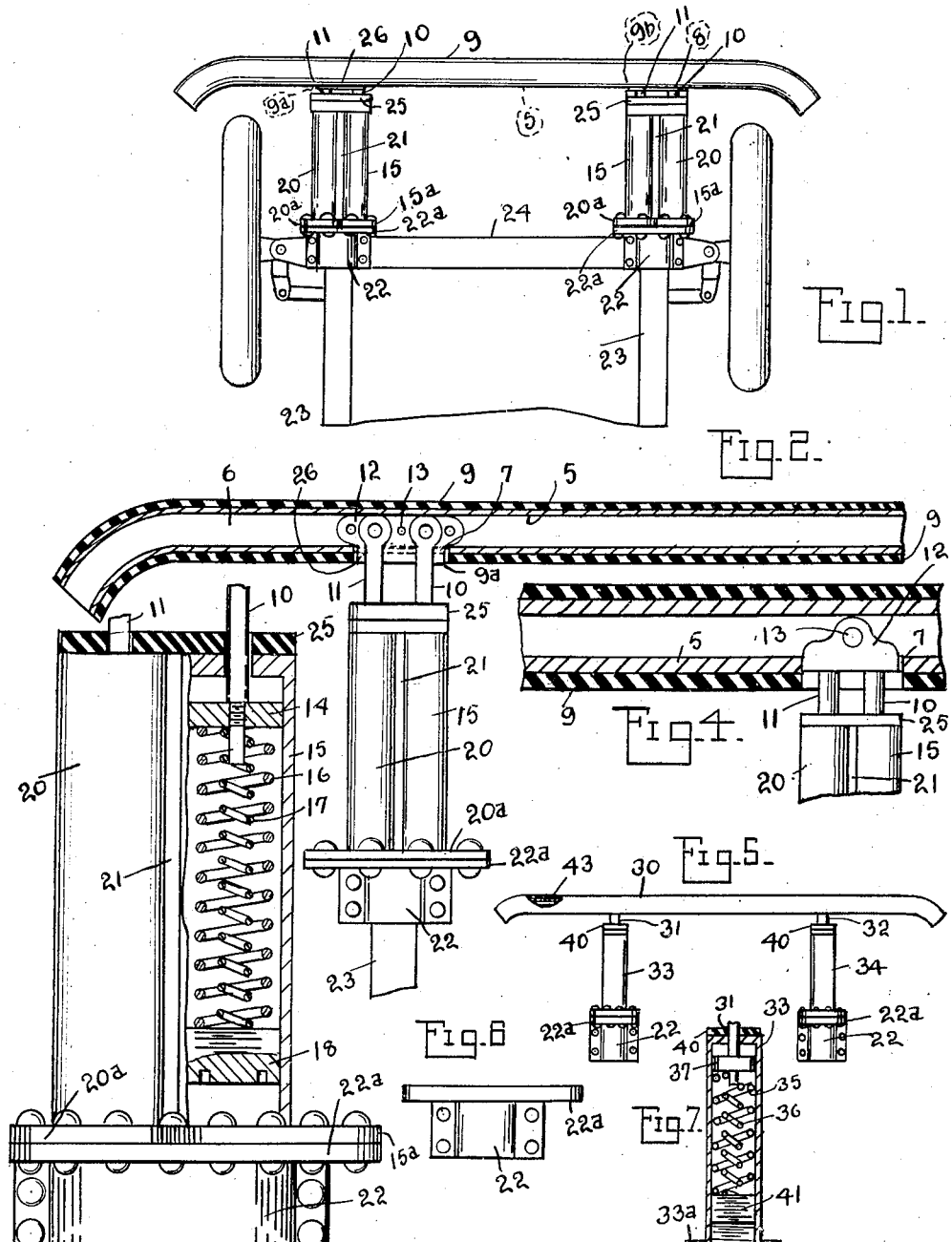
INVENTOR.
Micheal Critani
By George D. Richards
Attorney.

Patented Jan. 26, 1937

2,068,846

UNITED STATES PATENT OFFICE 2,068,846

DUPLEX SPRING VEHICLE BUMPER

Micheal Critani, Westfield, N. J.

Application November 22, 1934, Serial No. 754,303

4 Claims. (Cl. 293—55)

This invention relates to improvements in vehicle bumpers and its leading object is to provide a bumper having a main collision resisting bar, horizontal rods supporting this bar and having pivotal engagement therewith, duplex spring boxes receiving the rear ends of the rods to take up the shock of impact or collision, and a resilient rubber covering for the main bar or bumper, whereby it will be protected from injury, or the injury will be minimized and the force of the shock of collision will be modified.

A further object of the invention is to provide a combined construction of this general type, wherein the detail parts are connecting in an improved manner, and the construction is rendered more durable and satisfactory.

With the above and other objects in view the invention consists in certain new and useful constructions, combinations and arrangements of parts, clearly described by the following specification, and fully illustrated in the accompanying drawing, in which:—

Fig. 1 is a plan view, showing the bumper mounted on the forward end of a vehicle frame.

Fig. 2 is a fragmentary view of the bumper structure shown in Fig. 1 but drawn on an enlarged scale and with the bumper bar and its sheath shown in section.

Fig. 3 is a longitudinal sectional view of one of the duplex spring boxes, the companion box being shown in elevation.

Fig. 4 is a similar view showing a modified form, the spring box being shown in plan.

Fig. 5 is a plan view, on a reduced scale, partly broken away, of a modified form of the invention.

Fig. 6 is a detail plan view, enlarged, of a bracket.

Fig. 7 is a longitudinal sectional view of one of the spring boxes shown in Fig. 5.

Referring to the accompanying drawing illustrating the practical construction of the invention 5 designates the main bumper bar, which is constructed of tubular stock, and bent rearwardly at its outer end portions. This hollow bar thus provides a channel or bore 6 and the rear wall of this bar is formed with longitudinal slots 7 and 8, which are spaced apart from each other. The bar 5 is protected by means of a rubber sheath 9, composed of resilient rubber, which is also formed with slots 9a and 9b, which register with the slots 7 and 8 of the bumper bar.

The bumper bar is supported near each end by the companion spring rods 10 and 11, and as each set of rods is like the other set only one set will be described in detail, together with the spring connections therefor.

The forward ends of the spring bars or rods 10 and 11 extend through the slots in one end of the bumper bar, and are pivotally connected with the bearing block 12, which is mounted in the bore or channel 6. This bearing block may be pivotally supported, as by the single pin 13, located midway of its ends, which extends through the bar 5, or may be fastened in place against pivotal movement, relative to the bar 5.

The rear end of the spring rod 10 is equipped with a spring follower 14, which works in the spring box 15, in which the helical springs 16 and 17 are arranged. The spring 17 is smaller than the spring 16, and is formed with an opposite helix to that of the spring 16.

The rear end of the spring box 15 is equipped with a thrust block 18, which is engaged by the rear ends of the springs 16 and 17. The thrust block 18 is threaded into the inner end of the spring box 15, and as shown in Fig. 3, is partly in side elevation and partly in section. The other spring rod 11 is similarly equipped and engages the duplex springs in the companion spring box 20.

The two spring boxes 15 and 20 are united to each other by the integral web 21, in parallel relation to each other. The rear end of the spring box 15 is formed with an annular flange 15a, and the rear end of the spring box 20 is formed with an annular flange 20a. These flanges are bolted to the flange 22a of the bracket 22, which in turn is bolted on the forward forks or ends 23 of the vehicle frame 24.

By the special bracket support for the spring box, a strong and durable connection is provided, which diminishes rattling, and makes replacement easy and inexpensive.

When the bumper bar meets with a collision the first impact is taken up by the resilient rubber sheath of the bumper bar, which is subject to displacement under the force of the initial impact. The springs are then subject to compression, as the bumper bar is forced rearwardly, and as the rear side of the bumper bar is brought into contiguous relation to the forward ends of the spring boxes, rubber shock rings 25 are engaged by the bumper bar. These rings are mounted in the forward ends of the spring boxes, and serve to cushion the engagement of the bumper bar with the spring boxes, so that the noise and vibration produced by metallic collision is avoided.

Due to the pivotal connection of the twin sets of spring rods on each end of the bumper bar, the bumper may yield at one end to a greater degree than at the other end, and excessive strain upon either of the connecting brackets avoided.

In order to centralize the points of engagement between the bumper bar and the rubber shock or cushioning rings, the bearing blocks for the forward ends of the spring rods may be provided with rearward extensions or thrust bearings 26, which will engage the rubber shock rings 25, when the bumpers reach the approximate limit of rearward movement.

Should the bumper be subject to the impact of collision central of its ends it will yield in the direction of the impact force, both sets of spring bars and the shock absorbing springs yielding equally, or in correspondence to the force imposed upon the same.

All surfaces are rubber covered, and no points of external metal contact are left to produce annoying vibration.

In Figs. 5, 6 and 7, I show a modified construction of the invention, wherein the bumper bar 30 is supported on two spring bars 31 and 32, one for each end thereof. The bar or rod 31 works in the spring box 33, and the bar or rod 32 works in the spring box 34. The spring box 34 is constructed like the spring box 33, which alone will be described in detail.

The companion spring coils 35 and 36 are arranged in the spring box 33, and are formed with opposite helical coils, so that they will not interfere with each other. The inner end of the spring rod 31 is equipped with a spring follower 37, which engages both spring coils, and the inner ends of these spring coils engage the adjustable thrust block 41 at the inner end of the spring box. This thrust block 41 is threaded into the inner end of the spring box 33, in the same manner as above described in connection with the arrangement of the invention shown in Fig. 3 with respect to thrust block 18 thereof. Said thrust block 41 is shown in elevation in Fig. 7.

A rubber cushion pad 40 is placed against the outer end of each spring box, to be engaged by the bumper bar when the same is forced to the limit of its yield toward the spring boxes. A rubber sheath 43 is also placed around the bumper bar, which serves to silence the same and receive initial shocks.

By using spring coils of appropriate resistance the bumper may be adapted for the requirements of vehicles of various types, horsepower and loading.

Various changes in the details of construction, combination and arrangement of parts, may be made, in keeping with the scope of the claims, hereinafter set forth.

I claim as new:—

1. A bumper for road vehicles consisting of a main bumper bar, companion spring rods for supporting each end of the bumper, a block pivotally supported in each end of the bumper, each block being pivotally connected to one set of the spring rods, companion spring boxes for each set of spring rods, means for securing each companion set of boxes to the frame of a vehicle, a spring follower on each spring rod, companion spring coils in each box, one coil being arranged within the other and of opposite helical construction, and a rubber shock ring on the outer end of each spring box to receive the bumper bar.

2. The construction set forth in claim 1 including a rubber sheath on the bumper bar to receive initial impacts.

3. The construction set forth in claim 1, including an annular flange on the rear end of each spring box, and a bracket plate adapted to be clamped to the vehicle frame having a portion connected to each annular flange.

4. A vehicle bumper including a pair of cylindrical boxes disposed in parallel relation, a second similar pair of spring boxes, each box having a flange on its rear end securable to a vehicle part, the second pair of boxes being adapted to be secured on one side of a vehicle opposite to that of the first pair of boxes, a pair of oppositely coiled helical springs in each box, a spring follower in each box engaging said springs, a rod connected with each spring follower and extending from its box, a tubular bumper bar having openings in its inner side to receive the outer ends of the adjacent rods of each pair of rods, a rubber sheath covering said bumper bar, and a block disposed in the bumper bar in line with each opening thereof and having pivotal connection with the ends of the rods on each side of the bumper bar.

MICHEAL CRITANI.